United States Patent
Yanamandra et al.

(10) Patent No.: US 12,159,476 B2
(45) Date of Patent: *Dec. 3, 2024

(54) SYSTEM AND METHOD FOR SEPARATION AND CLASSIFICATION OF UNSTRUCTURED DOCUMENTS

(71) Applicant: OPEN TEXT SA ULC, Halifax (CA)

(72) Inventors: Sangeetha Yanamandra, Hyderabad (IN); Srirama Chandra Akella, Hyderabad (IN); Satish Chandra Paled, Hyderabad (IN); Newton Isaac Rajkumar, Hyderabad (IN)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,117

(22) Filed: Jan. 2, 2023

(65) Prior Publication Data

US 2023/0145743 A1 May 11, 2023

Related U.S. Application Data

(63) Continuation of application No. 17/330,083, filed on May 25, 2021, now Pat. No. 11,544,947, which is a continuation of application No. 16/438,146, filed on Jun. 11, 2019, now Pat. No. 11,030,446.

(51) Int. Cl.
*G06V 30/413* (2022.01)
*G06V 30/416* (2022.01)

(52) U.S. Cl.
CPC ......... *G06V 30/413* (2022.01); *G06V 30/416* (2022.01)

(58) Field of Classification Search
CPC ..................... G06V 30/416; G06V 30/413
See application file for complete search history.

(56) References Cited

U.S. PATENT DOCUMENTS

| | | | |
|---|---|---|---|
| 9,373,029 B2 * | 6/2016 | Hull ..................... | G06V 30/412 |
| 11,157,553 B2 * | 10/2021 | Sawruk .................. | G06N 3/045 |
| 2013/0282361 A1 * | 10/2013 | Hartl ..................... | G06F 40/295 |
| | | | 704/9 |
| 2016/0162467 A1 * | 6/2016 | Munro .................... | G06F 40/30 |
| | | | 704/9 |

* cited by examiner

*Primary Examiner* — Congvan Tran
(74) *Attorney, Agent, or Firm* — Sprinkle IP Law Group

(57) ABSTRACT

A classification system is provided that separates unclassified pages into unclassified, separated documents and classifies the separated documents. The classification system applies a page-level recognition model to the unclassified pages to recognize the logical boundaries between documents and, based on the logical boundaries, separates the pages into unclassified, separated documents. The classification system further applies a document-level recognition model to classify the separated documents.

21 Claims, 16 Drawing Sheets

| | |
|---|---|
| PAGE_1 | START |
| PAGE_2 | OTHER |
| PAGE_3 | OTHER |
| PAGE_4 | END |
| PAGE_5 | START |
| PAGE_6 | OTHER |
| PAGE_7 | OTHER |
| PAGE_8 | OTHER |
| PAGE_9 | END |
| PAGE_10 | START |
| PAGE_11 | OTHER |
| PAGE_12 | OTHER |
| PAGE_13 | OTHER |
| PAGE_14 | END |
| PAGE_98 | OTHER |
| PAGE_99 | OTHER |

| GROUP | START PAGE | END PAGE |
|---|---|---|
| GROUP_1 | PAGE_1 | PAGE_4 |
| GROUP_2 | PAGE_5 | PAGE_9 |
| GROUP_3 | PAGE_10 | PAGE_14 |

| | | |
|---|---|---|
| ORPHANS_1 | PAGE_98 | PAGE_99 |

FIG. 8

| | | |
|---|---|---|
| PAGE_1 | START | ⎫ 903 |
| PAGE_2 | OTHER | |
| PAGE_3 | OTHER | |
| PAGE_4 | OTHER | |
| PAGE_5 | OTHER | GROUP_1 |
| PAGE_6 | OTHER | |
| PAGE_7 | OTHER | |
| PAGE_8 | OTHER | |
| PAGE_9 | OTHER | ⎭ 905 |
| PAGE_10 | START | ⎫ 904 |
| PAGE_11 | OTHER | |
| PAGE_12 | OTHER | GROUP_2 |
| PAGE_13 | OTHER | |
| PAGE_14 | END | ⎭ |
| PAGE_98 | OTHER | |
| PAGE_99 | OTHER | |

900

| GROUP | START PAGE | END PAGE |
|---|---|---|
| GROUP_1 | PAGE_1 | PAGE_9 |
| GROUP_2 | PAGE_10 | PAGE_14 |

920

| ORPHANS_1 | PAGE_98 | PAGE_99 |
|---|---|---|

| | | |
|---|---|---|
| PAGE_1 | OTHER | 1003 |
| PAGE_2 | OTHER | 1004 |
| PAGE_3 | END | 1005 |
| PAGE_4 | START | 1006 ⎫ GROUP_2 |
| PAGE_5 | END | ⎭ |
| PAGE_6 | OTHER | ⎫ |
| PAGE_7 | OTHER | ⎬ ORPHANS |
| PAGE_8 | OTHER | |
| PAGE_9 | OTHER | ⎭ |
| PAGE_10 | START | ⎫ |
| PAGE_11 | OTHER | |
| PAGE_12 | OTHER | ⎬ GROUP_3 |
| PAGE_13 | OTHER | |
| PAGE_14 | END | ⎭ |
| PAGE_98 | OTHER | ⎫ ORPHANS |
| PAGE_99 | OTHER | ⎭ |

1000

| GROUP | START PAGE | END PAGE |
|---|---|---|
| GROUP_1 | PAGE_1 | PAGE_3 |
| GROUP_2 | PAGE_4 | PAGE_5 |
| GROUP_3 | PAGE_10 | PAGE_14 |

1020

| ORPHANS_1 | PAGE_5 | PAGE_9 |
|---|---|---|
| ORPHANS_2 | PAGE_98 | PAGE_99 |

| PAGE_1 | START |
|---|---|
| PAGE_2 | OTHER |
| PAGE_3 | OTHER |
| PAGE_4 | END |
| PAGE_5 | START |
| PAGE_6 | OTHER |
| PAGE_7 | OTHER |
| PAGE_8 | OTHER |
| PAGE_9 | END |
| PAGE_10 | START |
| PAGE_11 | OTHER |
| PAGE_12 | OTHER |
| PAGE_13 | OTHER |
| PAGE_14 | OTHER |
| PAGE_98 | END |
| PAGE_99 | OTHER |

GROUP_1: PAGE_1 – PAGE_4
GROUP_2: PAGE_5 – PAGE_9
GROUP_3: PAGE_10 – PAGE_98

1100

| GROUP | START PAGE | END PAGE |
|---|---|---|
| GROUP_1 | PAGE_1 | PAGE_4 |
| GROUP_2 | PAGE_5 | PAGE_9 |
| GROUP_3 | PAGE_10 | PAGE_98 |

1120

| ORPHANS_1 | PAGE_99 | PAGE_99 |
|---|---|---|

| | |
|---|---|
| PAGE_1 | START |
| PAGE_2 | OTHER |
| PAGE_3 | OTHER |
| PAGE_4 | END |
| PAGE_5 | START |
| PAGE_6 | START |
| PAGE_7 | OTHER |
| PAGE_8 | OTHER |
| PAGE_9 | START |
| PAGE_10 | END |
| PAGE_11 | END |
| PAGE_12 | OTHER |
| PAGE_13 | OTHER |
| PAGE_14 | END |
| PAGE_98 | OTHER |
| PAGE_99 | OTHER |

1200, 1205, 1206, 1208, 1207, 1210, 1211, 1212, 1214
GROUP_1, GROUP_2, GROUP_3, GROUP_4

| GROUP | START | END |
|---|---|---|
| GROUP_1 | PAGE_1 | PAGE_4 |
| GROUP_2 | PAGE_5 | PAGE_8 |
| GROUP_3 | PAGE_9 | PAGE_10 |
| GROUP_4 | PAGE_11 | PAGE_11 |

1220

| ORPHANS_1 | PAGE_12 | PAGE_99 |
|---|---|---|

SYSTEM AND METHOD FOR SEPARATION AND CLASSIFICATION OF UNSTRUCTURED DOCUMENTS

CROSS-REFERENCE TO RELATED APPLICATION(S)

This application is a continuation of, and claims a benefit of priority under 35 U.S.C. 120 from, U.S. patent application Ser. No. 17/330,083, filed May 25, 2021, entitled "SYSTEM AND METHOD FOR SEPARATION AND CLASSIFICATION OF UNSTRUCTURED DOCUMENTS," issued as U.S. Pat. No. 11,544,947, is a continuation of, and claims a benefit of priority under 35 U.S.C. 120 from, U.S. patent application Ser. No. 16/438,146, filed Jun. 11, 2019, entitled "SYSTEM AND METHOD FOR SEPARATION AND CLASSIFICATION OF UNSTRUCTURED DOCUMENTS," issued as U.S. Pat. No. 11,030,446, which are fully incorporated by reference herein for all purposes.

TECHNICAL FIELD

This disclosure relates generally to classifying electronic documents. More particularly, this disclosure relates to classifying unstructured electronic documents.

BACKGROUND

Many commercial and governmental transactions still rely heavily on underlying paper documents. Document capture solutions allow organizations to capture and store electronic copies of these paper documents. The electronic documents can be classified and indexed, thereby enhancing search and retrieval and allowing document-type dependent workflows to be implemented. Some document capture solutions classify documents using a combination of automatic and manual classification and indexing. In these solutions, documents that cannot be classified or indexed automatically with sufficient confidence are presented to an operator for manual classification or indexing.

The ease with which a system can classify a document depends, in part, on whether the document is a structured document, semi-structured document or unstructured document.

Structured documents are documents in which there are fixed locations for each piece of data so that data appears at the same place on the page with minimum variance. Examples of structured documents include, but are not limited to, forms in which each instance of the form has the same layout with fields positioned at the same places on the page with minimum variance. Structured documents are generally the easiest documents to classify and index.

Many business documents are semi-structured. Semi-structured documents follow general layout patterns, but there is not a defined geometric region for each piece of data. As such, the location of data, number of fields, etc. may vary between documents of the same document type. Using the example of a purchase order that has a line item row of fields, individual purchase orders may have a different number of line item rows. Thus, line item data may appear in different places in the two purchase orders. Semi-structured documents are generally more difficult to classify and index than structured documents.

Unstructured documents, at least from the perspective of the document capture system, have little structure or consistency. For example, business-to-consumer correspondence follows no regular structural pattern. Unstructured documents present the hardest challenge of the three categories.

Some document recognition functionality relies on identifying specific keywords or identification marks in defined regions of documents to identify document types. While such recognition functionality can have a high-level of accuracy with respect to identifying and classifying structured documents they do not work well for semi-structured and unstructured documents, particularly when the boundaries of the semi-structured or unstructured documents are unknown.

SUMMARY

One general aspect includes a classification system that separates unclassified pages into unclassified, separated documents and classifies the separated documents. More particularly, the classification system applies a page-level recognition model to the unclassified pages to recognize the logical boundaries between documents and, based on the logical boundaries, separates the pages into unclassified, separated documents. The classification system further applies a document-level recognition model to classify the separated documents into, for example, document types.

According to one aspect of the present disclosure, the classification system receives a set of input pages and separates the input pages into a first set of classified documents and a set of unclassified pages. The classification system applies the page-level recognition model to the unclassified pages to recognize the logical boundaries between documents and separates the unclassified pages into separated documents based on the logical boundaries. The classification system further applies a document-level recognition model to classify the separated documents into, for example, document types.

One embodiment comprises a classification system includes a non-transitory computer-readable medium configured with a page-level recognition model trained to recognize a document start page and a document end page and a document-level recognition model trained to recognize a document type. The non-transitory computer-readable medium further stores instructions executable by a processor to determine a page-level classification for each unstructured document page in a set of unstructured document pages by processing content extracted from the unstructured document pages using the page-level recognition model to determine the page-level classification for the unstructured document page. The instructions are further executable to identify a sequence of unstructured document pages from a first unstructured document page classified as the document start page to a second unstructured document page classified as the document end page. The sequence can be identified based on the page-level classifications for the unstructured document pages in the set of unstructured document pages. The instructions are further executable to determine a first document-level classification for a separated unstructured document created from the sequence of unstructured documents. The document-level classification can be determined by processing content extracted from the separated unstructured document using the document-level recognition model. The instructions are also executable to automatically update metadata for the separated, unstructured document with the first document-level classification. Other embodiments of this aspect include corresponding computer systems, apparatus, and computer programs recorded on one or more computer storage devices.

Embodiments may include one or more of the following features. According to one embodiment, the stored instructions are further executable to generate an indication of the sequence of unstructured document pages. The stored instructions may be executable to combine the sequence of unstructured document pages into the separated unstructured document based on the indication. The stored instructions may be executable to store the separated unstructured document as an unclassified document. The stored instructions may be executable to copy the sequence of unstructured document pages to a document folder corresponding to the separated unstructured document, where the document folder is accessible by a capture system to merge the sequence of unstructured document pages to create the separated unstructured document. The stored instructions may be executable to separate a merged document containing structured and unstructured documents into a first set of classified documents and the set of unstructured document pages. The stored instructions may be executable to individually store each unstructured document page in the set of unstructured document pages. According to one embodiment, an unstructured document page in the set of unstructured document pages includes a page image from a merged document. The stored instructions may be executable to store the first set of classified documents and the separated unstructured document in a hierarchy established for the merged document. The stored instructions may be executable to identify an orphan page from the set of unstructured document pages based on the page-level classifications for the unstructured document pages in the set of unstructured document pages. The stored instructions may be executable to determine a second document-level classification for the orphan page by processing content extracted from the orphan page using the document-level recognition model. Implementations of the described techniques may include hardware, a method or process, or computer software on a computer-accessible medium.

Another embodiment includes a method for classifying unstructured documents including: for each unstructured document page in a set of unstructured document pages, determining, by a processor, a page-level classification for the unstructured document page by processing content extracted from the unstructured document page using a page-level recognition model to determine the page-level classification for the unstructured document page, the page-level recognition model trained to recognize a document start page and a document end page of an unstructured document. The method also includes identifying, by the processor, a sequence of unstructured document pages from a first unstructured document page classified as the document start page to a second unstructured document page classified as the document end page, where the identifying is based on the page-level classifications for the unstructured document pages in the set of unstructured document pages. The method also includes determining, by the processor, a first document-level classification for a separated unstructured document created from the sequence of unstructured documents by processing content extracted from the separated unstructured document using a document-level recognition model trained to recognize a document type. The method also includes automatically updating, by the processor, metadata for the separated unstructured document with the first document-level classification. Other embodiments of this aspect include corresponding computer systems, apparatus, and computer programs recorded on one or more computer storage devices, each configured to perform the actions of the methods.

Embodiments may include one or more of the following features. The method further including combining a sequence of unstructured document pages into the separated unstructured document. The method may also include storing the separated unstructured document as an unclassified document. The method may further include generating an indication of the sequence of unstructured document pages. The method may also include copying the sequence of unstructured document pages to a document folder corresponding to the separated unstructured document, the document folder accessible by a capture system to merge the sequence of unstructured document pages to create the separated unstructured document. The method may further include separating a merged document containing structured and unstructured documents into a first set of classified documents and the set of unstructured document pages. The method may also include individually storing each unstructured document page in the set of unstructured document pages. According to one embodiment, each unstructured document page in the set of unstructured document pages includes a page image from the merged document. The method further including the processor storing the first set of classified documents and separated unstructured document in a hierarchy established for the merged document. The method further including the processor identifying an orphan page from the set of unstructured document pages based on the page-level classifications for the unstructured document pages in the set of unstructured document pages. The method further including the processor determining a second document-level classification for the orphan page by processing content extracted from the orphan page using the document-level recognition model. Implementations of the described techniques may include hardware, a method or process, or computer software on a computer-accessible medium.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 8 illustrates one embodiment of page-level classifications and resulting page groups and orphans according to one embodiment;

FIG. 9 illustrates another embodiment of page-level classifications and resulting page groups and orphans;

FIG. 10 illustrates another embodiment of page-level classifications and resulting page groups and orphans;

FIG. 11 illustrates another embodiment of page-level classifications and resulting page groups and orphans;

FIG. 12 illustrates another embodiment of page-level classifications and resulting page groups and orphans;

DETAILED DESCRIPTION

Figure 1:
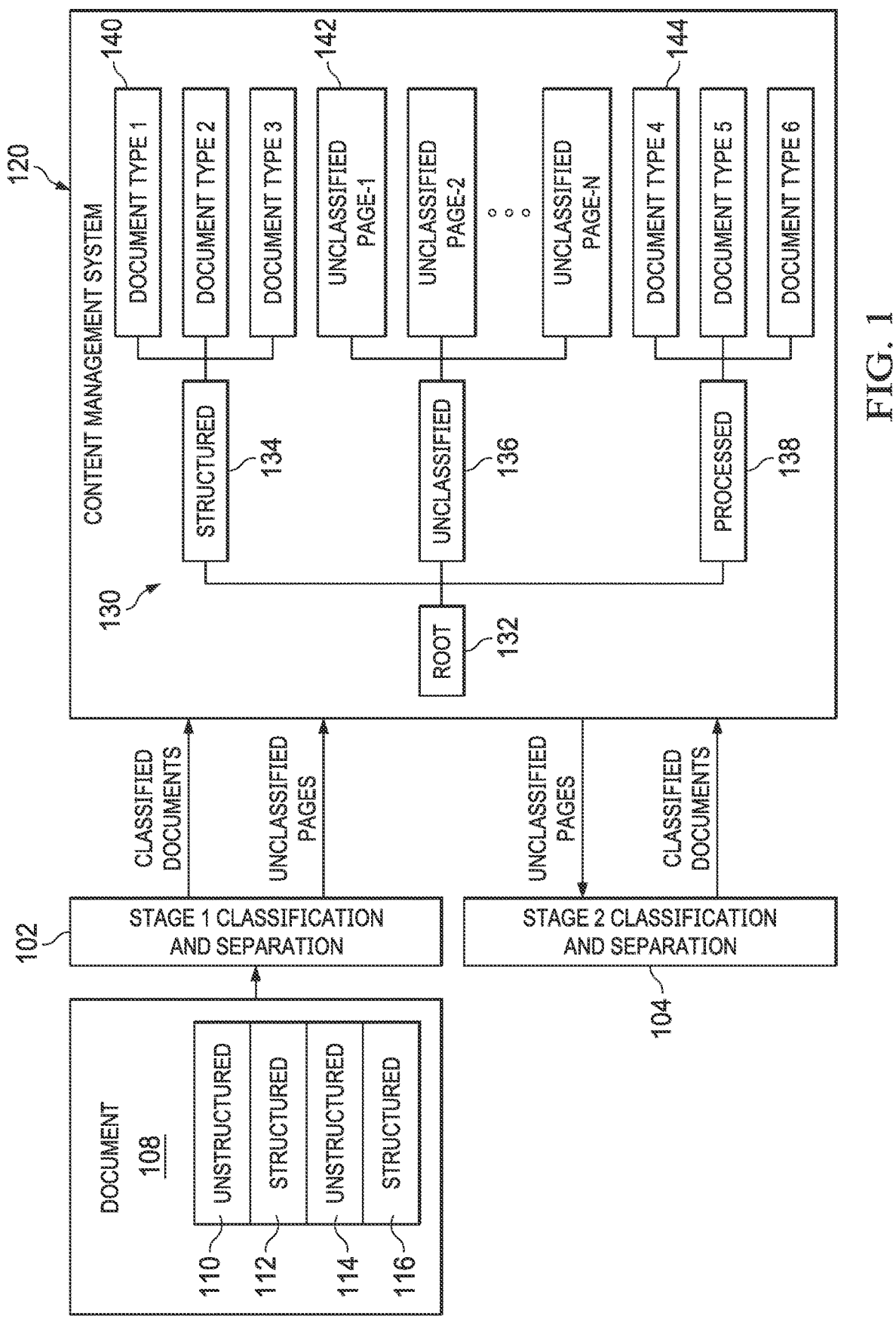
FIG. 1 is diagrammatic representation of one embodiment of a content classification process processing a merged document.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide classification systems and methods to classify documents. According to one aspect of the disclosed subject matter, a classification system is provided that separates unclassified pages into unclassified separated documents and classifies the separated documents. More particularly, the classification system applies a page-level recognition model to the unclassified pages to recognize the logical boundaries between documents and, based on the logical boundaries, separates the pages into unclassified separated documents. The classification system further applies a document-level recognition model to classify the separated documents into, for example, document types.

According to one embodiment, the classification system receives a set of input pages and processes the input pages to create a set of structured documents and a set of unclassified pages. The classification system applies the page-level recognition model to the unclassified pages to recognize the logical boundaries between documents and separates the unclassified pages into separated unstructured or semi-structured documents based on the logical boundaries. The classification system further applies a document-level recognition model to classify the separated documents into, for example, document types.

As discussed above many organizations use document capture solutions to capture electronic copies of documents and to classify and index captured documents. In practice, organizations often capture multiple documents and merge them together into a single document for further processing. For example, it is not uncommon for financial institutions to scan all the documents related to a mortgage (e.g., various government forms, loan applicant financial statements, the mortgage, the sales deed and other documents) into a single merged mortgage document (e.g., a single file that contains the page images (pages) of the constituent documents). According to one aspect of the present disclosure, a classification system can process a merged document to classify the structured documents, unstructured and semi-structured documents that make up the merged document.

In a given implementation items, such as pages and documents, may be classified on multiple dimensions. An "unclassified" page or document can refer to a page or document that is considered unclassified in a particular dimension along which the classification system is configured to classify the document or page and a "classified" page or document can refer to a page or document that is considered "classified" a particular dimension.

FIG. 1 is diagrammatic representation of one embodiment of a content classification process processing a merged document 108. As will be appreciated, a merged document may include structured and unstructured documents in any order. In the embodiment illustrated, merged document 108 includes unstructured document page images 110, structured document page images 112, unstructured document page images 114 and structured document page images 116.

The classification process comprises first stage classification and separation 102 and second stage classification and separation 104 configured to separate, classify and index documents from merged document 108 and store the documents in content management system 120 according to a document hierarchy 130. In the illustrated example, the document hierarchy includes a root node 132 representing merged document 108, structured document node 134 to store structured documents separated from merged document 108, unclassified page node 136 to store unclassified page images from merged document 108 and processed pages node 138 to store documents determined from the unclassified page images.

First stage classification and separation 102 is configured to process a set of input pages, such as merged document 108, to identify structured documents from the set of input pages, separate each identified structured document into its own document (e.g., into its own file), classify each structured document by document type and index the classified structured documents by extracting data from the documents and storing the data extracted from a document as metadata associated with that document. First stage classification and separation 102 stores the classified, structured documents 140 with associated metadata under structured documents node 134. In this example, classified, structured documents are considered classified because they have been assigned a document type classification by first stage classification and separation 102.

Any page images of the set of input pages (e.g., any page images of merged document 108) that first stage classification and separation 102 cannot classify—that is, any page images from merged document 108 that first stage classification and separation 102 does not include in a structured document 140—first stage classification and separation 102 stores as individual unclassified pages 142. For example, first stage classification and separation 102 stores each unclassified page image from merged document 108 as a separate file.

Second stage classification and separation 104 is configured to process unclassified pages 142 to identify unstructured documents, separate out each identified unstructured document, classify the identified unstructured documents and index the identified unstructured documents. Second stage classification and separation 104 stores the classified, unstructured documents as processed documents 144 with associated metadata.

In some embodiments, page images of a semi-structured document are treated as unstructured document page images. In other embodiments, at least some page images of a semi-structured document are treated similarly to structured page images such that certain semi-structured documents are classified in first stage classification and separation 102.

Figure 2A:
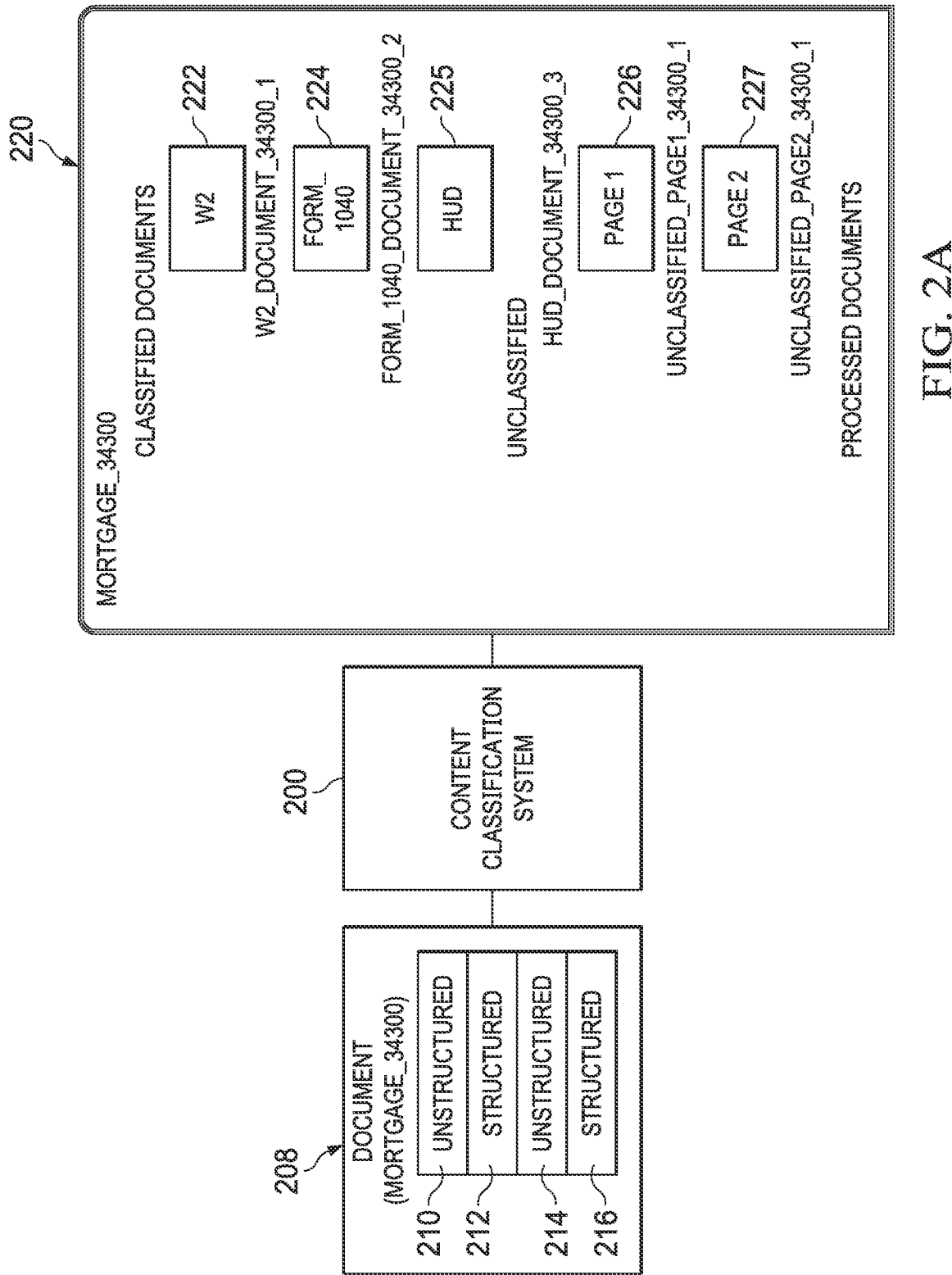
FIG. 2A is a diagrammatic representation of one embodiment of a content classification system performing an embodiment of first stage classification and separation.
Figure 2B:
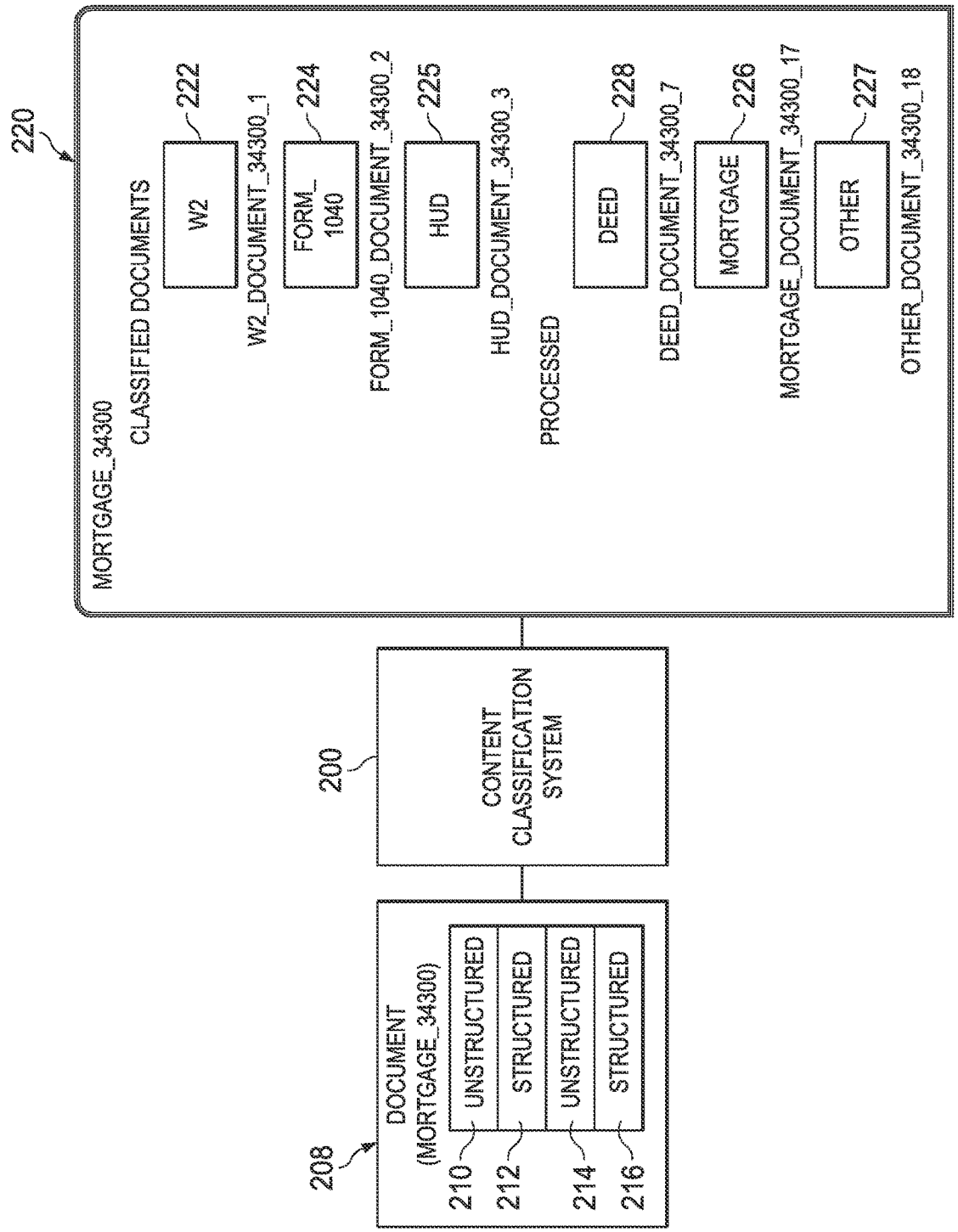
FIG. 2B is a diagrammatic representation of one embodiment of content classification system performing an embodiment of second stage classification and separation 104.
Figure 2C:
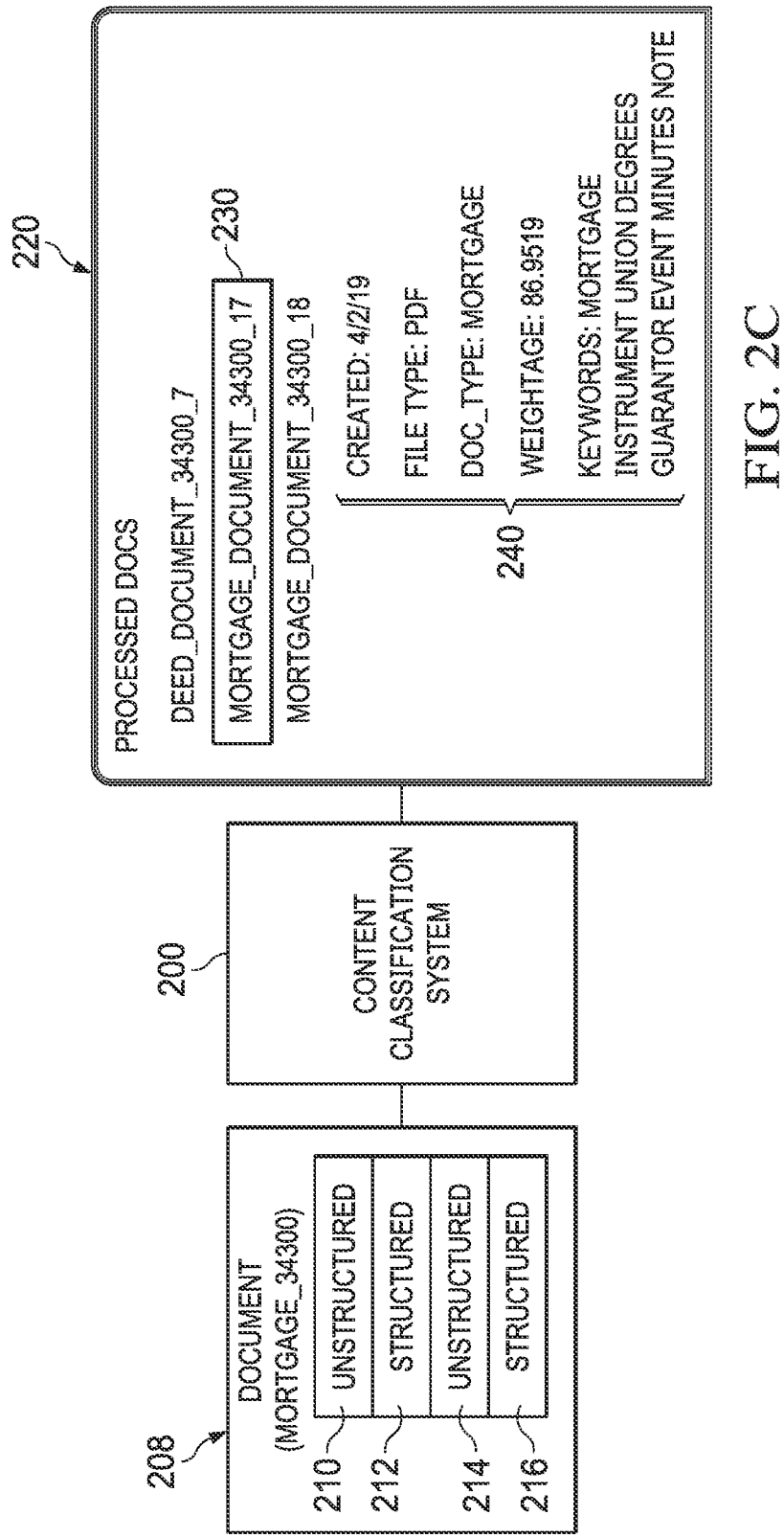
FIG. 2C is a diagrammatic representation of one embodiment illustrating metadata associated with a processed, unstructured document.

With reference to FIG. 2A, FIG. 2B and FIG. 2C, FIG. 2A is a diagrammatic representation of one embodiment of a content classification system 200 performing an embodiment of first stage classification and separation 102, FIG. 2B is a diagrammatic representation of one embodiment of content classification system 200 performing an embodiment of second stage classification and separation 104, and FIG. 2C is a diagrammatic representation of one embodiment illustrating metadata associated with a processed, unstructured document.

In the illustrated embodiment, content classification system 200 receives a merged mortgage document 208 that includes images of unstructured document pages (unstructured document page images 210, 214), images of structured document pages (structured document page images 212, 216), images of unstructured document pages (unstructured document page images 214). In first stage classification and separation 102, content classification system 200 identifies structured documents, separates each identified structured document into its own file, classifies each structured document by document type, and indexes the classified structured documents by extracting data from the documents and storing the data extracted from a document as metadata associated with that document. Content classification system 200 stores page images from merged mortgage document 208 that it could not classify during first stage classification and separation 102 as individual unclassified pages.

As discussed above, classified structured documents and unclassified page images can be stored to a content management system. FIG. 2A illustrates one embodiment of a graphical user interface (GUI) 220 provided by a content management system (e.g., content management system 120) illustrating merged mortgage document 208 stored according to a document hierarchy after first stage classification and separation 102. In this example, content classification system 200 identified, separated, classified and indexed first classified document 222 (e.g., a W-2 form), second classified document 224 (e.g., a tax Form 1040), third classified document 225 (e.g., a HUD statement). The remaining page images of merged mortgage document 208 are stored as individual unclassified pages (e.g., first unclassified page 226, second unclassified page 227 and so on). It can be noted that, in FIG. 2A, the file name of each classified document indicates the document classification (e.g., W2, Form_1040, HUD) and the merged document from which it was separated. Similarly, the file names of the unclassified pages indicate that the pages are unclassified and the merged document from which they were separated.

Turning to FIG. 2B, in second stage classification and separation 104, content classification system 200 processes the unclassified pages to identify and separate unstructured documents, classify the unstructured documents and index the identified unstructured documents. In FIG. 2B, GUI 220 is updated to indicate the unclassified pages of merged mortgage document 208 have been processed to create first classified unstructured document 228, second classified unstructured document 230 and third unstructured document 232. In this example, content classification system 200 classifies one or more of the unclassified pages as a "Deed," one or more of the unclassified pages as a "Mortgage" and one or more unclassified pages as "Other". The "Other" classification indicates a group of pages that could not be classified by second stage classification and separation 104 as any other document type. It can be noted that the file name of first classified unstructured document 228, second classified unstructured document 230, third unstructured document 232 indicates the document classification and the merged document in which it was contained.

As discussed above, content classification system 200 indexes documents. FIG. 2C illustrates one embodiment of user interface 220 in which content classification system 200 has classified and indexed unstructured document 228. In this example, user interface 220 displays a set of document metadata 240 for unstructured document 228, including the classification ("Doc_type: Mortgage"), the confidence of the classification ("Weightage:86.519"), indexing keywords extracted from unstructured document 228 and other metadata.

Figure 3:
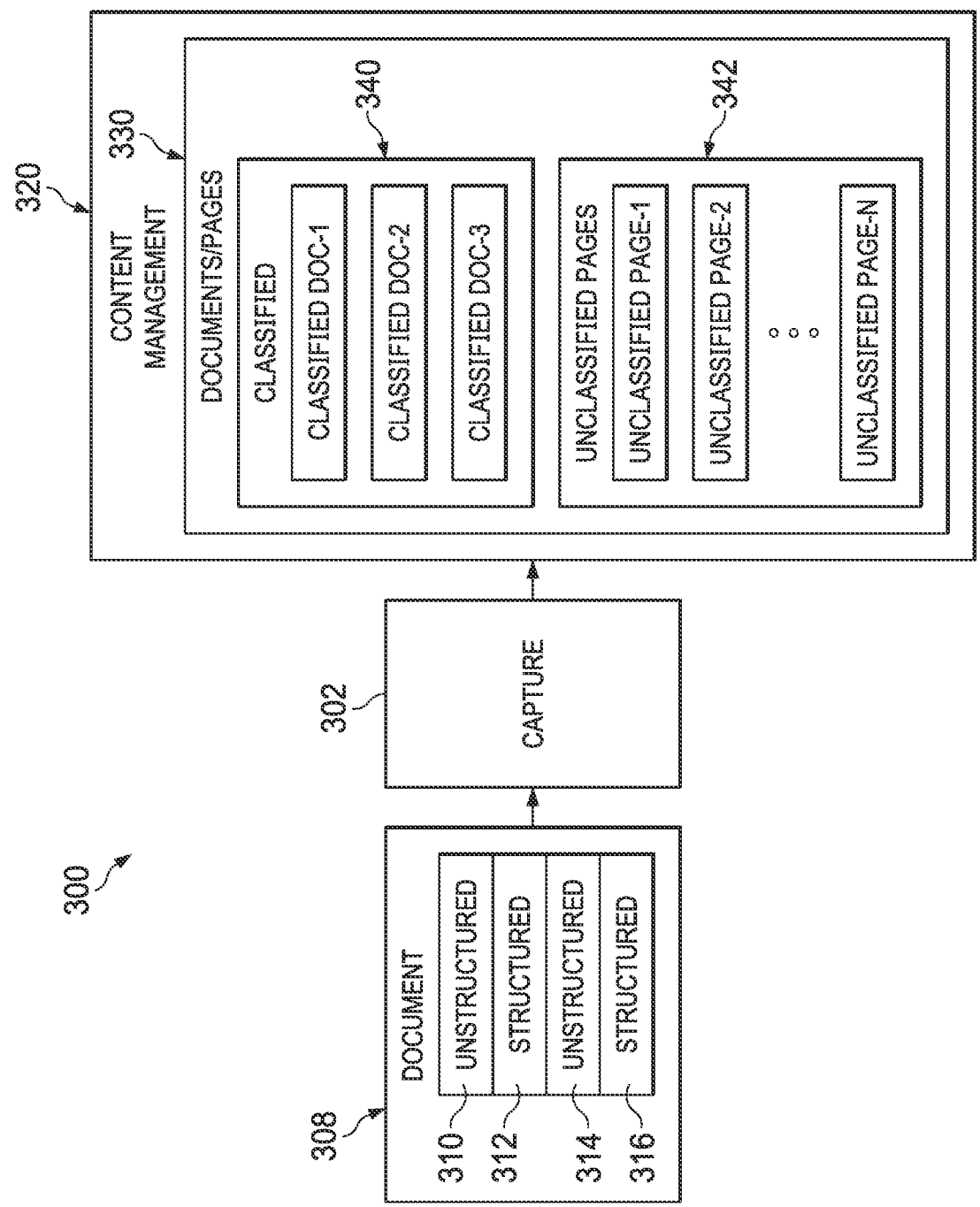
FIG. 3 is a diagrammatic representation of one embodiment of a content classification system implementing one embodiment of first stage classification and separation 102.

FIG. 3 is a diagrammatic representation of one embodiment of a content classification system 300 implementing one embodiment of first stage classification and separation 102. In the embodiment of FIG. 3, content classification system 300 includes a document capture system 302 and content management system 320. Example embodiments of document capture system 302 and content management system 320 are discussed in conjunction with FIG. 14.

Document capture system 302 intakes electronic documents from a variety of sources including, but not limited to, high-end scanning devices, Multi-Function Peripherals (MFPs), file system folders, email servers, file shares, FTP sites, or other sources. In the embodiment illustrated, document capture system 302 ingests merged document 308, which includes unstructured document page images 310, structured document page images 312, unstructured document page images 314 and structured document page images 316. Document capture system 302 processes merged document 308 to extract documents and pages and stores documents and pages 330 to content management system 320 (e.g., according to a document hierarchy).

Document capture system 302 applies various document classification techniques to identify documents in merged document 308 and classify the identified documents. In one embodiment of first stage classification and separation, document capture system 302 applies techniques suitable for identifying and classifying structured documents. In such an embodiment, classified documents 340 comprise classified structured documents separated from merged document 308. Document capture system 302 further applies optical character recognition (OCR) or other recognition techniques to classified documents 340, extracts desired content from each classified document 340 and stores content extracted from a document 340 as metadata of the classified document 340.

By way of example, but not limitation, document capture system 302 applies structured document templates corresponding to various structured document types to the pages of merged document 308 to identify pages that have a high confidence fit with a template. If a page, or group pages for a multi-page document, fit a template with an acceptable degree of confidence, document capture system 302 separates the page or group of pages out as a separate document (separate file) and classifies the document according to the document type to which the template corresponds. For example, document capture system 302 can apply a W-2 template to a merged mortgage document, identify a page from the merged mortgage document as having a high confidence fit to the W-2 template and store the page as a separate document classified as a W-2 document. In this example, document capture system 302 further extracts data from the W-2 document (e.g., individual name, income or other data) and stores the extracted data as metadata of the W-2 document.

Any page images of merged document 308 that document capture system 302 cannot classify in first stage classification and separation—that is, any page images from merged document 308 that document capture system 302 does not include in a classified document 340—document capture system 302 stores as individual unclassified pages 342 (e.g., as individual files) in a configured location.

Based on the processing by document capture system 302, content management system 320 thus comprises a data store configured with an associated set of documents and pages 330. According to one embodiment, documents and pages 330 separated from merged document 308 are stored according to a document hierarchy for merged document 308.

Figure 4A:
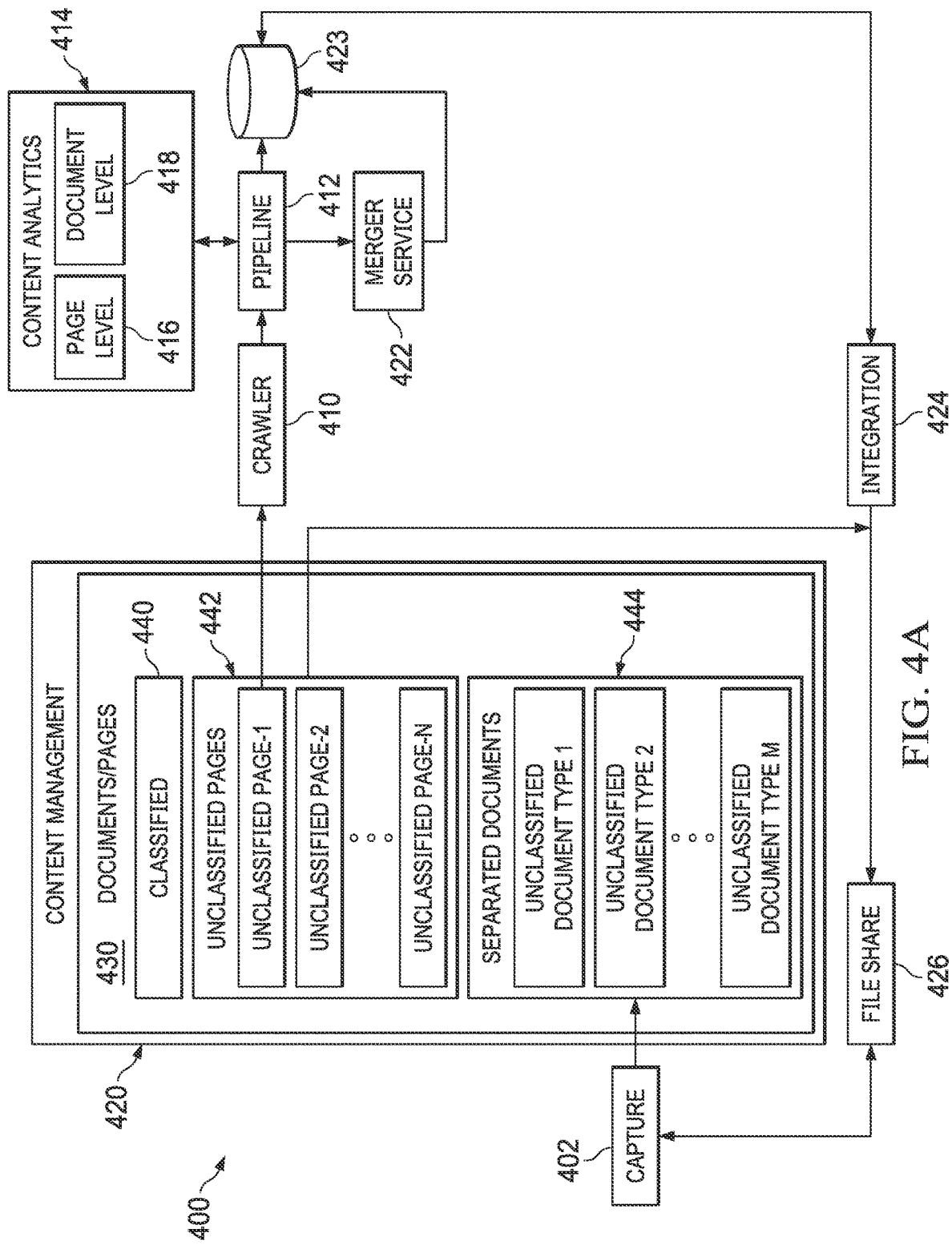
FIG. 4A is a diagrammatic representation of one embodiment of a content classification system implementing one embodiment of a first portion of a second stage classification and separation.
Figure 4B:
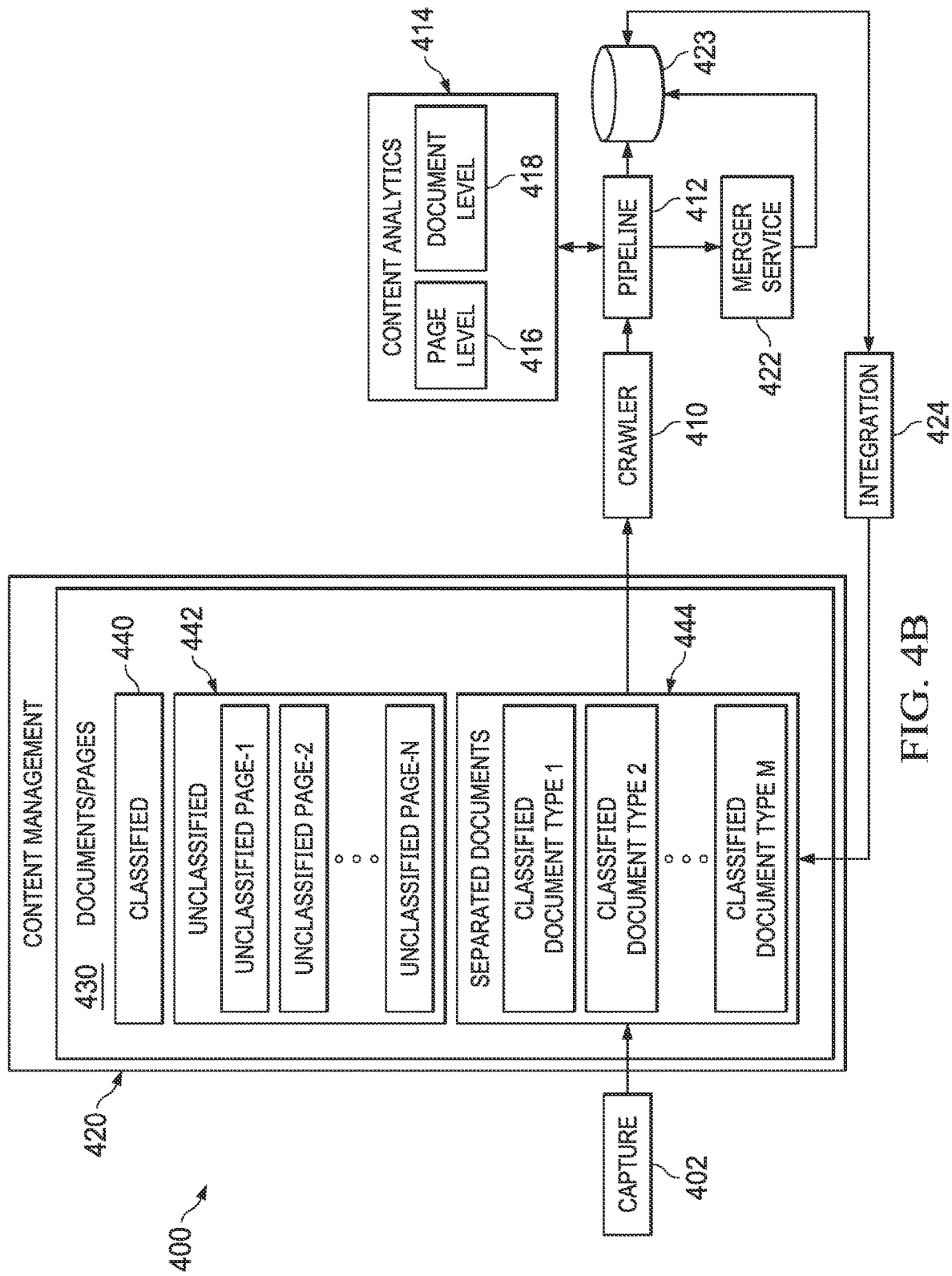
FIG. 4B is a diagrammatic representation of one embodiment of a content classification system implementing one embodiment of a second portion of a second stage classification and separation.
Figure 14:
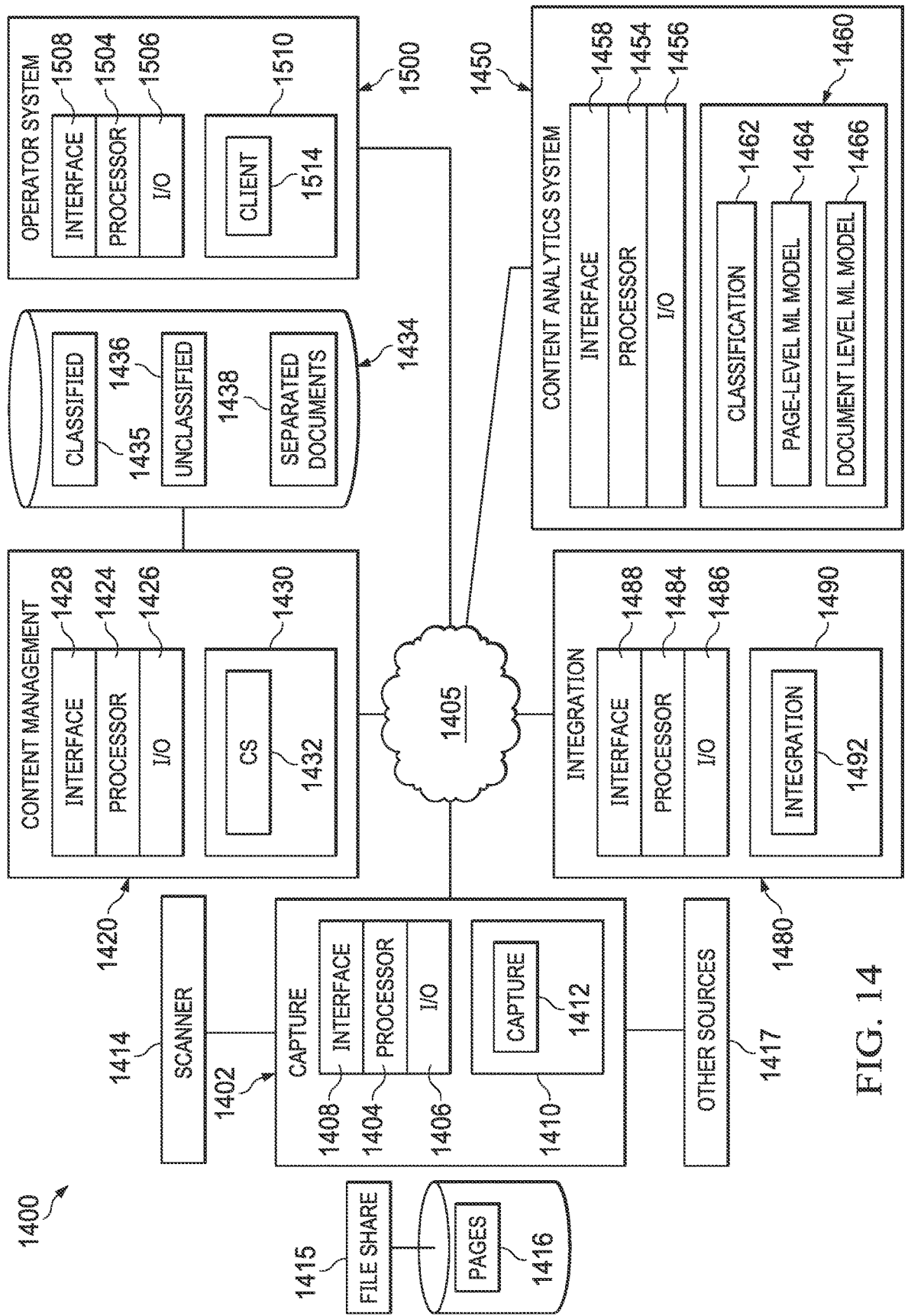
FIG. 14 is a diagrammatic representation of one embodiment of a content classification system in a distributed network environment.

FIG. 4A and FIG. 4B are diagrammatic representations of one embodiment of a content classification system 400 implementing one embodiment of a second stage classification and separation. Content classification system 400 comprises document capture system 402, content management system 420, crawler 410, processing pipeline 412, content analytics module 414, merger service 422, pipeline data store 423, integration system 424 and file share 426. One example embodiment of content classification system 400 is illustrated in FIG. 14.

In the embodiment illustrated, content management system 420 comprises a data store configured with an associated set of documents and pages 430. According to one embodiment, associated set of documents and pages 430 are separated from a merged document or other set of input pages via a first stage classification and separation 102 as discussed above. According to one embodiment then, documents 440 may comprise classified structured documents and unclassified pages 442 may comprise images of unstructured document pages. In FIG. 4A, content classification system 400 processes unclassified pages 442 to create unclassified separated documents 444. In FIG. 4B, content classification system 400 classifies separated documents 444 by document type. According to one embodiment, classified separated documents 444 may comprise classified unstructured documents.

Content classification system 400 utilizes a number of machine learning models including page-level recognition model 416 and a document-level recognition model 418. Page-level recognition model 416 is trained to classify pages as a document "start page", a document "end page" or "other" (e.g., a class indicating the page is not a start page or end page). Document-level recognition model is trained to classify documents by document type. As will be appreciated, a variety of machine learning models can be trained as a page-level recognition model or document level recognition model.

According to one embodiment, page-level recognition model 416 is a machine learning classifier trained using feature vectors representing features of document start pages and document end pages for a plurality of document types. In one embodiment, page-level recognition model 416 is trained to classify an input feature vector based on a reference set of feature vectors corresponding to the predefined classes. In such an embodiment, page-level recognition model 416 can compare an input feature vector for a page to the reference set of feature vectors representing the known classes to determine which of the reference set of feature vectors has the highest similarity to the input feature vector. Page-level recognition model 416 outputs the page-level class associated with the reference feature vector having the highest similarity to the input feature vector as a classification for the page from which the input feature vector was created. Page-level recognition model 416 can also output a confidence level for the class. In one embodiment, page-level recognition model 416 is trained to classify an input feature vector as "start page" or "end page." If the confidence is below a configurable threshold, page-level recognition model 416 can output "other."

According to one embodiment, document-level recognition model 418 is a machine learning classifier trained using feature vectors representing features of complete documents of various document types. In one embodiment, document-level recognition model 418 is trained to classify an input feature vector based on a reference set of feature vectors corresponding to the predefined classes of document types. In such an embodiment, document-level recognition model 418 can compare an input feature vector for a document to the reference set of feature vectors representing the known document type classes to determine which of the reference set of feature vectors has the highest similarity to the input feature vector. Document-level recognition model 418 outputs the class associated with the reference feature vector having the highest similarity to the input feature vector as a classification for the document from which the input feature vector was created. Document-level recognition model 418 can also output a confidence level for the class.

Content classification system 400 includes crawler 410 configured to crawl the location (e.g., folder) for unclassified pages 442 and feed a set of pages 442 to pipeline 412. In one embodiment, page crawler 410 sends batches of pages to pipeline 412 where each batch corresponds to a particular merged document, folder or other unit of work. Pipeline 412 performs OCR or other recognition techniques, extracts content from each page image in a set of pages and provides the extracted content for each page image to content analytics module 414. Content analytics module 414 processes the content extracted from each page image in the batch using page-level recognition model 416 to determine a page-level classification for that page.

Pipeline 412 passes the page-level classifications for the set of pages to merger service 422 to identify pages to be grouped as documents. More particularly, merger service 422 applies page grouping rules to build logical boundaries of documents based on the page-level classifications for a set of pages. Merger service 422 also identifies orphan pages.

Merger service 422 stores page group definitions and indicators of orphan pages in pipeline data store 423 (e.g., a database or other data store). One embodiment of a method for determining page groups and orphans is discussed in conjunction with FIG. 7. Example embodiments of processing page-level classifications to determine page groups and orphans are also discussed in conjunction with FIGS. 8-12.

Integration system 424 integrates processing of capture system 402 and content analytics module 414 into a processing flow. Integration system 424 is configured to access pipeline data store 423 and content management system 420. According to one embodiment, integration system 424 retrieves page group definitions from pipeline data store 423, retrieves the sequence of pages indicated by each page group from content management system 420 and uploads the sequence of pages corresponding to each page group to a separate folder. Integration system 424 can also retrieve indicators of orphans from pipeline data store 423 and upload each orphan to a separate folder or upload multiple orphan pages to the same folders. The folders can be named to correspond to a merged document from which the unclassified pages were extracted.

As an example, integration system 424 can access a first page group definition specifying a first sequence of pages, retrieve the pages 442 in the first sequence of pages from content management system 420 and upload the first sequence of pages to a folder "group_34300_7" at file share 426. Similarly, integration system 424 can access a second page group definition specifying a second sequence of pages, retrieve the pages 442 in the second sequence of pages from content management system 420 and upload the second sequence of pages to a folder "group_34300_17" at file share 426. As a further example, integration system 424 can access indicators of orphans, retrieve the orphan pages from pages 442 from content management system 420 and upload the orphans of pages to a folder "group_34300_18".

As discussed above, file share 426 is a document source for document capture system 402. Based on the folder structure of file share 426, document capture system 402 merges pages in each page group folder into a separate document. For example, document capture system 402 merges the pages in the "group_34300_7" folder into "document_3400_7", merges pages in the "group_34300_17" folder into "document_3400_17" document and merges pages in the "group_34300_17" into "document_3400_17". The new separated documents are stored as separated documents 444. At this point, the separated documents 444 are considered unclassified as they have not undergone document-level classification.

Turning to FIG. 4B, crawler 410 is configured to crawl a location (e.g., folder) and feed separated documents 444 to pipeline 412. Pipeline 412 performs OCR or other recognition operations on each document 444, extracts content (images and/or text, including unstructured text) from a separated document 444 and provides the content extracted from the separated document 444 to content analytics module 414. Content analytics module 414 processes the content extracted from the separated document 444 using document-level recognition model 418 to determine a document type classification and confidence. For example, document-level recognition model 418 can determine that an unclassified separated document 444 is a "mortgage" with a weightage 86.9519 as illustrated in the example of FIG. 2C. Documents that cannot be classified as another class with a threshold level of confidence can be classified as "other".

According to one embodiment, pipeline 412 stores the document type classification and confidence returned by content analytics module 414 for a separated document 444 in pipeline data store 423. Further, pipeline 412 is configured to store at least a portion of the extracted content as metadata for the separated document 444 in data store 423. In some embodiments, the extracted content selected as metadata depends on the document type.

Integration system 424, according to one embodiment, accesses data store 423, reads the data for the separated document 444 and updates content management system 420 with the document classification, confidence and metadata. As such, content management system 420 is updated through the second stage classification and separation such that separated documents 444 are classified by document type.

Figure 5:
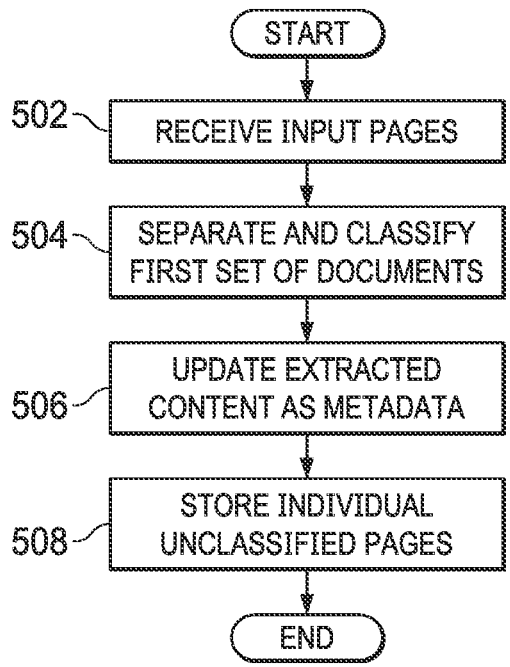
FIG. 5 is a flow chart illustrating one embodiment of a method for classification and separation.

FIG. 5 is a flow chart illustrating one embodiment of a method for classification and separation. One or more steps of FIG. 5 may be implemented by a content classification system, such as content classification systems 200, 300, 400, 1400. In some embodiments, one or more steps of FIG. 5 are performed in a first stage classification and separation 102.

At step 502, a content classification system receives a set of input pages, where the set of input pages includes structured document page images and unstructured document page images. At step 504, the content classification system separates a first set of documents from the set of input pages and classifies the documents in the first set of documents. By way of example, but not limitation, the content classification system applies structured document templates corresponding to various structured document types to the pages in the set of input pages to identify pages that have a high confidence fit with a template. If a page, or group pages for a multi-page document, fit a template with an acceptable degree of confidence, the content classification system separates the page or group of pages out as a separate document (separate file) and classifies the document according to the document type to which the template corresponds. For example, the content classification system may apply a W-2 template to a merged mortgage document, identify a page from the merged mortgage document as having a high confidence fit to the W-2 template, and store the page as a separate document classified as a W-2 document. Thus, according to one embodiment, the first set of documents comprises structured documents.

At step 506, the classification system extracts content from the documents classified in step 504 and updates the metadata of the documents with the extracted content. According to one embodiment, the content classification system applies OCR or other recognition techniques to classified documents, extracts desired data from each classified document and stores the data extracted from a classified document as metadata of the classified document. For example, the content classification system extracts data (e.g., individual name, income or other data) from a W-2 document classified in step 504 and stores the extracted data as metadata of the W-2 document.

At step 508, page images in the set of input pages that were not included in a document separated out in step 504 are stored as individual unclassified pages (e.g., as individual page image files). The unclassified pages, in various embodiments, are unstructured or semi-structured document page images. The classified documents in the first set of documents and individual unclassified pages can be stored in a manner that associates them with the same set of input pages. For example, the classified documents in the first set of documents and individual unclassified pages separated from a merged document can be stored in a document hierarchy for the merged document.

FIG. 5 is merely an illustrative example and the disclosed subject matter is not limited to the ordering of or number of steps illustrated. Embodiments may implement additional steps or alternative steps, omit steps, or repeat steps.

Figure 6:
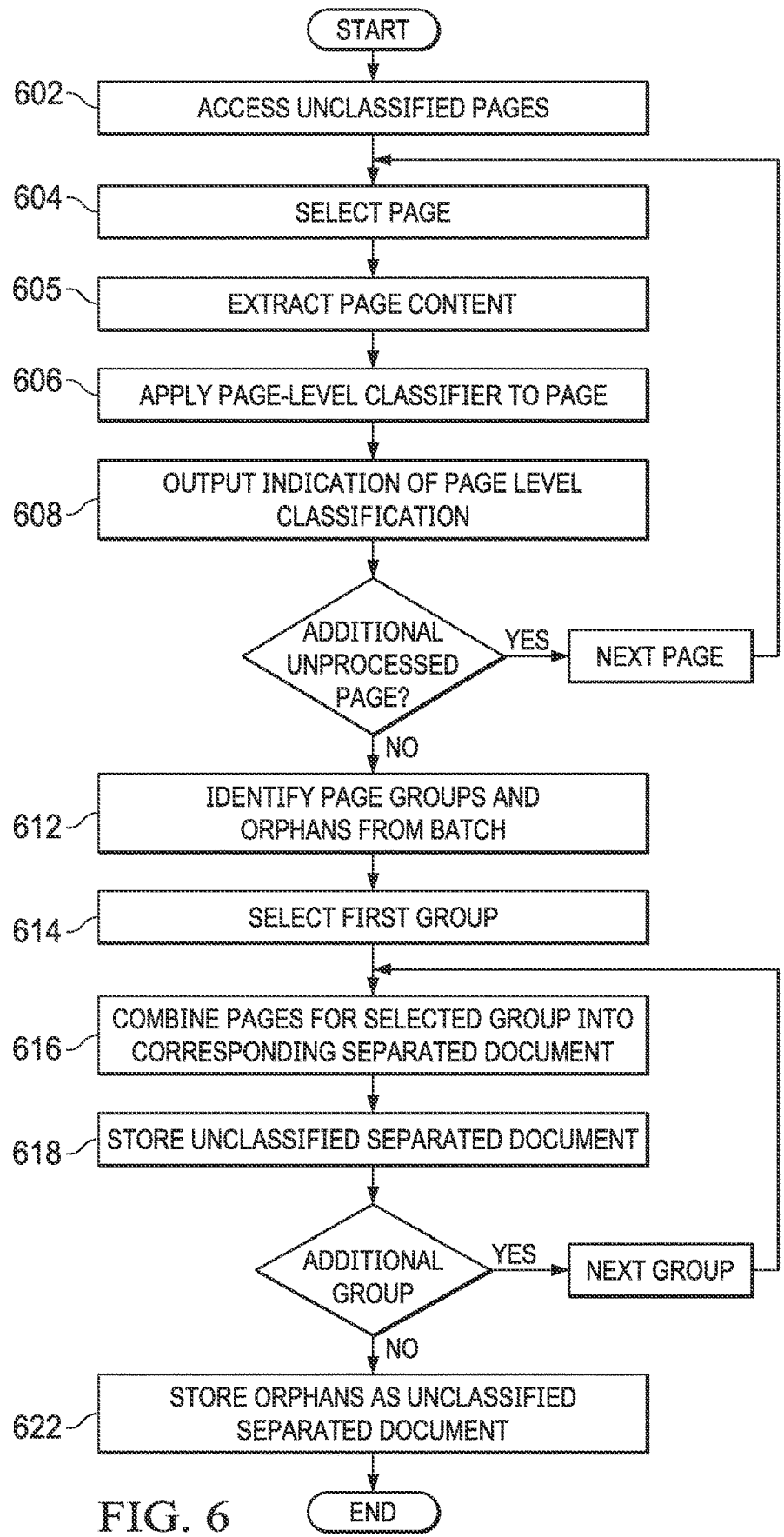
FIG. 6 is a flow chart illustrating one embodiment of a method for separating unclassified pages into documents.

FIG. 6 is a flow chart illustrating one embodiment of a method for separating unclassified pages, such as unclassified page images, into documents. One or more steps of FIG. 6 may be implemented by a content classification system, such as a content classification system 200, 300, 400, 1400. In some embodiments, one or more steps of FIG. 6 are performed in a second stage classification and separation 104.

At step 602, the classification system accesses a set of pages for processing. According to one embodiment, the classification system accesses a set of unclassified pages, where each unclassified page is an unstructured document page image or semi-structured document page image.

The classification system selects a page from the set of pages for processing at step 604. At step 605, the classification system extracts content from the selected page (e.g., via OCR or other recognition techniques). At step 606, the classification system applies a page-level recognition model to the selected page. Applying the page-level recognition model can include transforming the extracted content to an input feature vector and applying the page-level recognition model to the input feature vector.

According to one embodiment, the page-level recognition model is a machine learning classifier trained using feature vectors representing features of document start pages and document end pages for a plurality of document types and, as such, is trained to classify an input feature vector as a "start page," "end page" or "other". At step 608, the page-level recognition model outputs an indication of a page-level classification for the input feature vector and confidence level for the page-level class.

At step 612, the classification system identifies page groups and orphans based on the page-level classifications output for the batch. A page group indicates a page or sequence of pages that can be considered a document, whereas an orphan indicates an unclassified page that could not be grouped in a page group. Example embodiments of determining page groups and orphans for a set of pages are discussed below in conjunction with FIGS. 7-12.

At step 614, the classification system selects a page group from the page groups determined at step 612. At step 616, the classification system combines pages for the selected page group into a corresponding separated document; for example, merging a sequence of unclassified pages into a multi-page file. At step 618, the classification system stores the unclassified separated document.

As discussed above, the classification system can also identify orphans. At step 620, the classification system stores orphans as one or more unclassified, separated documents. In one embodiment, the classification system stores each orphan as an individual unclassified separated document. In another embodiment, the classification system merges orphans into their own unclassified separated document. In yet another embodiment, the classification system stores some orphans as individual unclassified separated documents and merges other orphans into their own unclassified separated document.

The unclassified separated documents created from a batch can be stored in a manner that associates them with a set of input pages. For example, unclassified separated documents created from pages of a merged document can be stored in a document hierarchy for the merged document.

FIG. 6 is merely an illustrative example and the disclosed subject matter is not limited to the ordering of or number of steps illustrated. Embodiments may implement additional steps or alternative steps, omit steps, or repeat steps. For example, steps 604-608 can be repeated for each page in a set of pages (e.g., a batch corresponding to a merged document or other set of pages selected for processing) and steps 616-618 for each page group identified from the set of pages.

Figure 7:
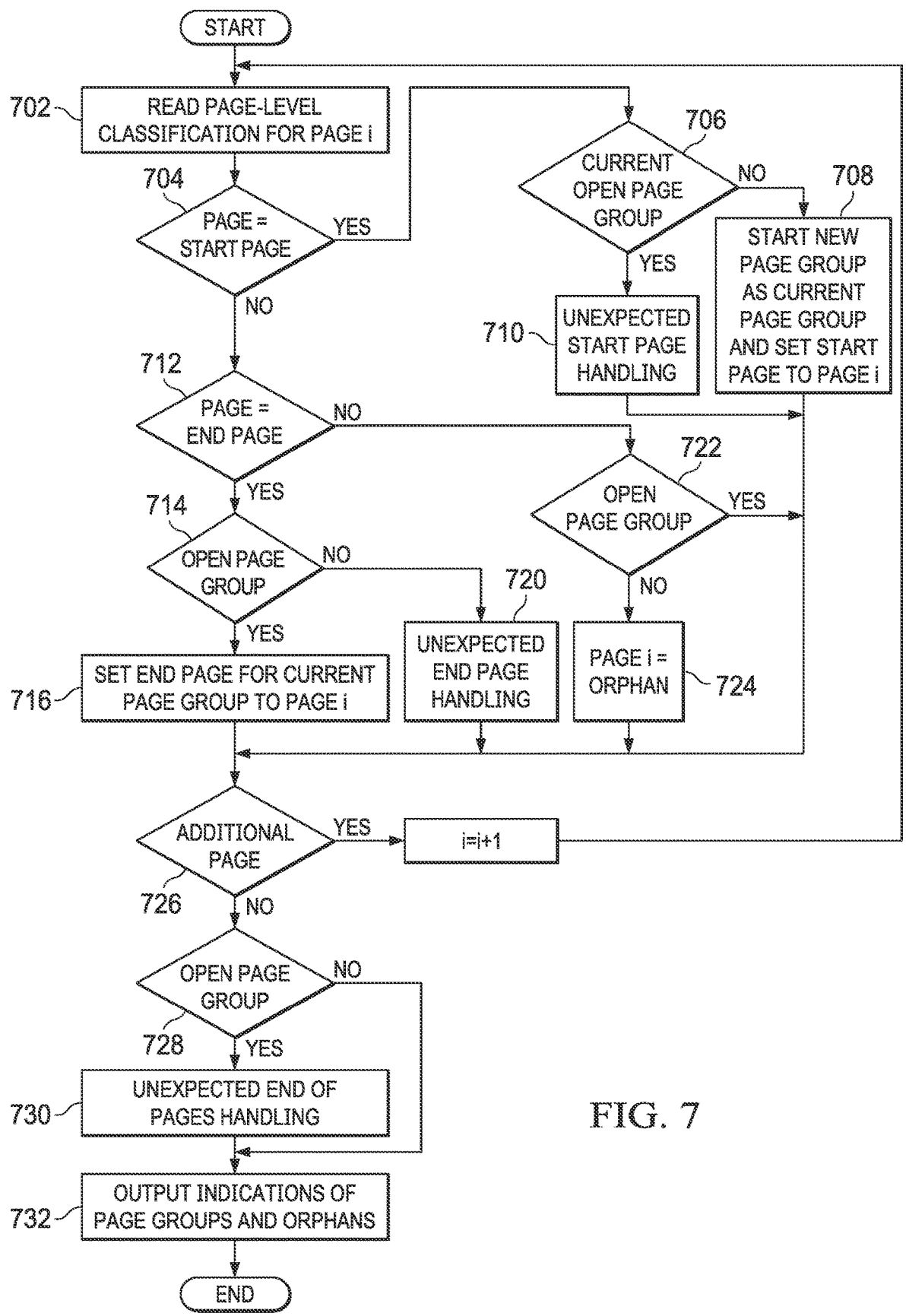
FIG. 7 is a flow chart illustrating one embodiment of a method for determining page groups and orphans from a set of pages.

FIG. 7 is a flow chart illustrating one embodiment of a method for determining page groups and orphans from a set of pages (e.g., a batch corresponding to a merged document or other set of pages selected for processing). One or more steps of FIG. 7 can be implemented by a classification system, such as a content classification system 200, 300, 400, 1400. According to one embodiment, one or more steps of FIG. 7 are implemented by merger service 422.

At step 702, the content classification system selects the page-level classification for a page i in the set of pages. If the page is classified as a document start page, as determined at step 704, processing proceeds to step 706 where the document processing classification system determines if there is a current open page group (a page group for which a start page, but no end page has been designated) for the batch. If there is not a current open page group, as determined at step 706, processing proceeds to step 708 and the classification system starts a new page group with page i designated as the start page for the page group. If there is a current open page group, the classification system implements unexpected start page processing (step 710). For example, the classification system applies page grouping rules to determine how to handle the unexpected start page. Processing proceeds to step 726.

Returning to step 704, if page i is not classified as a start page, processing proceeds to step 712 where the classification system determines if the page is classified as a document end page. If the page is classified as a document end page, processing proceeds to step 714. At step 714, the classification system determines if there is a current open page group. If so, the classification system sets the end page for the current open page group to page i (step 716). If there is not a current open page group, the content classification system handles the page according to page grouping rules to determine how to handle the unexpected end page (step 716). Processing proceeds to step 726.

Returning to step 712, if page i is not classified as a document end page, processing proceeds to step 722. At step 722, the classification system determines if there is a current open page group. If there is not a current open page group, the classification system considers page i as an orphan (step 724) and proceeds to step 726. If there is a current open page group, as determined at step 722, processing proceeds to step 726.

If there are no additional pages in the batch, the classification system can determine if there is a remaining open page group (step 728). If not, processing proceeds to step 732. If there is an open page group remaining, the classification system can implement unexpected end of pages handling (step 730). For example, the classification system can close the final page group using the last page i as the end page. In another embodiment, the classification system can designate the pages from the start page of the remaining open page group to the last page i in the batch as orphans.

FIG. 7 is merely an illustrative example and the disclosed subject matter is not limited to the ordering of or number of steps illustrated. Embodiments may implement additional steps or alternative steps, omit steps, or repeat steps. As indicated at step 726, for example, various steps can be repeated for each page in the set of pages.

FIGS. 8-12 illustrate examples of page-level classifications 800, 900, 1000, 1100, 1200 for a set of pages. For example, page-level classifications 800, page-level classifications 900, page-level classifications 1000, page-level classifications 1100, page-level classifications 1200 can represent page-level classifications provided to merger service 422 for unclassified pages 442. In any case, a classification system (e.g., content classification system 200, 300, 400, 1400) can process page-level classifications to determine page group definitions and indications of orphans that can be used to create separated unclassified documents (e.g., separated unclassified documents 444 of FIG. 4A).

In the example of FIG. 8, the classification system processes page-level classification 803 and creates page Group_1 (see, steps 702, 704, 706, 708 of FIG. 7), setting Page_1 as the start page for Group_1. The classification system continues to process the page-level classifications to page-level classification 804. At page-level classification 804, the classification system sets the end page for Group_1 to Page_4 (see, steps 702, 704, 712, 714, 716 of FIG. 7). The classification system continues processing page-level classifications 800 to create Group_2 and Group_3. When the classification system reads page-level classification 809 (step 702) it determines that page-level classification is neither a "start page" classification (step 704), nor an "end page" classification (step 712), and that there is not a current open page group (step 722). As such, the classification system designates Page_98 as an orphan (step 724). Similarly, the classification system can designate Page_99 as an orphan.

The classification system can thus create page group definitions 820 and an indicator of orphans 822. According to one embodiment, each page group definition identifies a sequence of pages to be combined into a separate document.

FIG. 9 illustrates one example of unexpected start page processing. In the example of FIG. 9, the classification system processes page-level classifications 900 and creates page Group_1, setting Page_1 as the start page for Group_1 (see, steps 702, 704, 706, 708 of FIG. 7). The classification system continues to process the page-level classifications. At page-level classification 904, the classification system reaches an unexpected "start page" because there is already a current open page group (i.e., at this point of processing page-level classifications 900 Group_1 does not have an end page set) (see, 702, 704, 706, 710 of FIG. 7). According to one embodiment, the classification system determines that the page-level classification 905 for the previous page is not a start page classification and based on this determination sets the end page of Group_1 to the previous page (sets the end page of Group_1 to Page_9). The classification system further creates a new page, page Group_2, setting Page_10, as the start page for the new page group. Processing of page-level classifications 900 can continue as discussed above. The classification system can thus output page group definitions 920 and an indication of orphans 922.

FIG. 10 illustrates the application of one embodiment of an unexpected end page processing rule. In the example of FIG. 10, the classification system processes page-level classifications 1000 and initially considers Page_1 and Page_2 orphans based on page-level classifications 1003, 1005. When the classification system reaches page-level classification 1005 it encounters an unexpected end-page because there is not a current open page group (see, steps 702, 704, 712, 714, 720 of FIG. 7). According to one embodiment of an unexpected end page processing rule, the classification system looks at the next page-level classification 1005 and based on a determination that the next page-level classification 1005 is "start page" creates a new page group (e.g., Group_1) ending with the current page (Page_3). The classification system includes any prior orphan pages that are in a continuous sequence with the unexpected end page in the new page group. The classification system continues processing page-level classifications 1000 to create page group definitions 1020 and indications of orphans 1022.

In the example of FIG. 11, the classification system processes page-level classifications 1100 to output page group definitions 1120 and indication of orphan 1122. It can be noted that several pages are missing from the batch (e.g., the set of pages skips from Page_14 to Page_98). According to one embodiment, the classification system ignores the missing pages (i.e., Group_3 includes all available pages from Page_10 to Page_98).

FIG. 12 illustrates additional examples of unexpected start page and end page processing. In the example of FIG. 12, the classification system processes page-level classifications 1200 to output page group definitions 1220 and an indication of orphans 1222. More particularly, as the classification system processes page-level classifications 1200, the classification system creates page Group_1 (see, steps 702, 704, 706, 708 of FIG. 7), setting Page_1 as the start page for Group_1. The classification system continues to process the page-level classifications and closes Group_1 at Page_4 (see, steps 702, 704, 712, 714, 716 of FIG. 7). At page-level classification 1205, the classification system creates a new page classification group, Group_2, setting the start page of Group_2 to Page_5 (see, steps 702, 704, 706, 708 of FIG. 7). At page-level classification 1206, the classification system encounters an unexpected start page (see, steps 702, 704, 706, 710 of FIG. 7). According to one embodiment, the classification system determines that the page-level classification 1205 for the previous page is a start page classification and based on this determination includes Page_6 in Group_2.

The classification system encounters a second unexpected start page at page-level classification 1207. According to one embodiment, the classification system determines that the page-level classification 1208 for the previous page is not a start page classification and based on this determination sets the end page of Group_2 to the previous page (sets the end page of Group_2 to Page_8). The classification system further creates a new page group, Group_3, setting Page_9, as the start page for the new page group. Processing of page-level classifications 1200 continues. At page-level classification 1210, the classification system closes Group_3.

The classification system encounters an unexpected end page at page-level classification 1211. According to one embodiment, the classification system determines that the page-level classification 1210 for the previous page is also an end page and based on this determination also determines that Page_11 is a single page document. In another embodiment, the classification system changes the end page of Group_3 to Page_11.

The classification system continues processing page-level classifications 1200, initially considering Page_12 and Page_13 to be orphans. The classification system encounters an unexpected end page at page-level classification 1212 (see, steps 702, 704, 712, 714, 720 of FIG. 7). According to one embodiment of an unexpected end page processing rule, the classification system looks at the next page-level classification 1214 and based on a determination that the next page-level classification 1214 is not "start page" also considers Page_14 and orphan.

The embodiments of unexpected start page, unexpected end page, and unexpected end of pages processing discussed above are provided by way of example. A classification system can implement a variety of page grouping rules to handle various cases. For example, according to one embodiment, a classification system applies parameters and weights to select a start page or an end page for a page group when two or more sequential pages in a row are classified as start pages or end pages.

In FIGS. 8-12, the pages are simply indicated as "Page_1," "Page_2", etc. However, it will be appreciated that the pages can be tracked using object identifiers, file names or other mechanisms so that the page groups and orphans can be used to retrieve or merge appropriate page images from a content management system (e.g., content management system 420) or another source.

Figure 13:
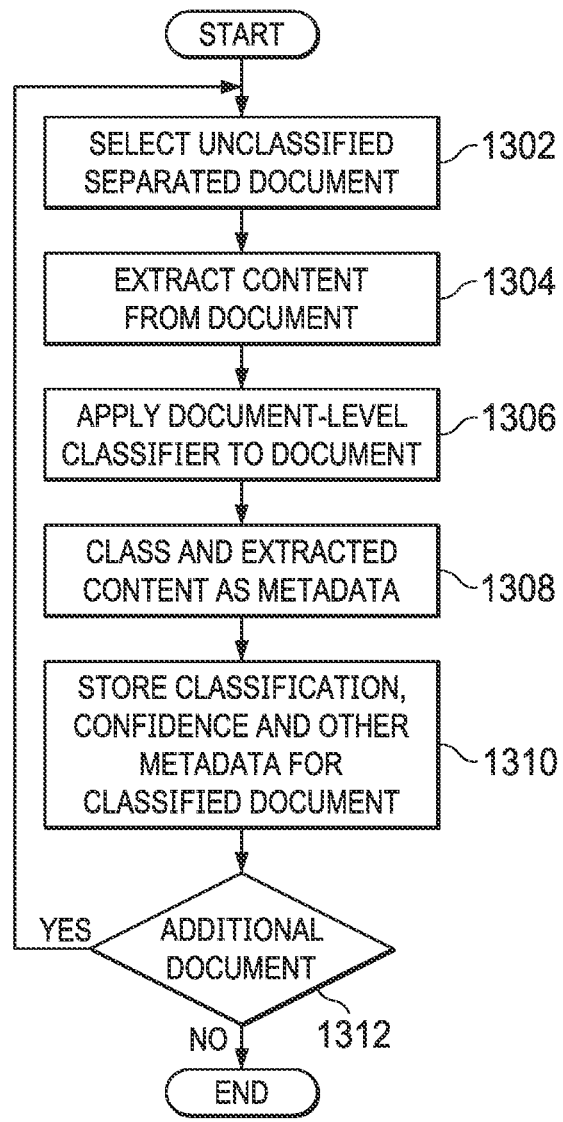
FIG. 13 is a flow chart illustrating one embodiment of a method for classifying separated documents.

A classification system can use page group definitions and orphans to identify pages that should be considered or merged together to create separated unclassified documents. FIG. 13 is a flow chart illustrating one embodiment of a method for classifying separated unclassified documents. According to one embodiment, one or more steps of FIG. 13 can be implemented by a classification system (e.g., content classification system 200, 300, 400, 1400).

At step 1302, the classification system accesses an unclassified separated document for classification. For example, in FIG. 4A crawler 410 selects an unclassified separated document 444 and provides the document to pipeline 412. At step 1304, the classification system performs OCR or other recognition operations on the unclassified separated document and extracts content (images and/or text, including unstructured text) from the unclassified separated document. At step 1306, the content classification system applies a document-level recognition model to the unclassified separated document to determine a document type classification and confidence. Applying the document-level recognition model can include transforming the extracted content to an input feature vector and applying the document-level recognition model to the input feature vector for the unclassified separated document. The document-level recognition model can also output a confidence level for the class. For example, the classification system can use a document-level recognition model to determine that an unclassified separated document 444 is a "mortgage" with a weightage 86.9519 as illustrated in the example of FIG. 2C.

According to one embodiment, the document-level recognition model is a machine learning classifier trained using feature vectors representing features of complete documents of various document types. In one embodiment, the document recognition model is trained to classify an input feature vector based on a reference set of feature vectors corresponding to the predefined classes of document types. In such an embodiment, the document-level recognition model can compare an input feature vector for a document to the reference set of feature vectors representing the known document type classes to determine which of the reference set of feature vectors has the highest similarity to the input feature vector. The document-level recognition model outputs the class associated with the reference feature vector having the highest similarity to the input feature vector as a classification for the document from which the input feature vector was created.

At step 1308, the classification system selects a portion of the extracted content as metadata for the separated document. In some embodiments, the extracted content selected as metadata depends on the document type. At step 1310, stores the document type classification, confidence returned by content analytics system, and at least a portion of the extracted content as metadata of the now classified separated document. For example, the classification system can store the class "mortgage," with a weightage 86.9519, and keywords extracted from a document as metadata of the document, as illustrated in FIG. 2C by the example document metadata 240 for classified unstructured document 230.

FIG. 13 is merely an illustrative example and the disclosed subject matter is not limited to the ordering of or number of steps illustrated. Embodiments may implement additional steps or alternative steps, omit steps, or repeat steps. As indicated at step 1312, for example, various steps can be repeated for each page in the set of pages.

Embodiments of the technology may be implemented on a computing system. Any combination of mobile desktop, server, embedded or other types of hardware may be used. FIG. 14 is a diagrammatic representation of one embodiment of a content classification system 1400 in a distributed network environment.

Classification system 1400 includes a capture system 1402, a content management system 1420, a content analytics system 1450, an integration system 1480 and an operator system 1500 coupled to a network 1405 (e.g., a local area network (LAN), a wide area network (WAN) such as the Internet, mobile network, or other type of network or combination thereof). Capture system 1402 comprises a computer processor 1404 and associated memory 1410, content management system 1420 comprises a computer processor 1424 and associated memory 1430, content analytics system 1450 comprises a computer processor 1454 and associated memory 1460, integration system 1480 comprises a computer processor 1484 and associated memory 1490 and operator system 1500 comprises a computer processor 1504 and associated memory 1510. Computer processors 1404, 1424, 1454, 1484, 1504 can each comprise an integrated circuit for processing instructions. For example, processors 1404, 1424, 1454, 1484, 1504 can comprise one or more cores or micro-cores of a processor. Memories 1410, 1430, 1460, 1490, 1510 can include volatile memory, non-volatile memory, semi-volatile memory or a combination thereof. Memories 1410, 1430, 1460, 1490, 1510 can include, for example, RAM, ROM, flash memory, a hard disk drive, a solid-state drive, an optical storage medium (e.g., CD-ROM), or other computer readable memory or combination thereof. Memories 1410, 1430, 1460, 1490, 1510 can each implement a storage hierarchy that includes cache memory, primary memory or secondary memory. In some embodiments, memories 1410, 1410, 1430, 1460, 1490, 1510 included storage space on a data storage array. Capture system 1402, content management system 1420, content analytics system 1450, integration system 1480 and operator system 1500 include respective input/output ("I/O") devices 1406, 1426, 1456, 1486, 1506, such as a keyboard, monitor, printer, electronic pointing device (e.g., mouse, trackball, stylus, etc.), or the like. Capture system 1402, content management system 1420, content analytics system 1450, integration system 1480 and operator system 1500 also include a respective communication interface 1408, 1428, 1458, 1488, 1508, such as a network interface card, to interface with network 1405.

Memory 1410 stores instructions executable by processor 1404. For example, memory 1410 can store a capture application 1412 configured to ingest a set of pages from a scanner 1414, file share 1415, or another source 1417 (e.g., MFP, file system folder, email server, FTP site). The set of pages images can include structured document page images, semi-structured document page images and/or unstructured document page images. According to one embodiment, the set of page images is received as a merged document.

Capture application 1412 separates the set of pages into a first set of classified documents (e.g., a set of classified structured documents) and a set of unclassified document pages (e.g., a set of unclassified unstructured or semi-structured page images), extracts metadata from the classified documents and stores the classified documents with metadata and unclassified document pages to content management system 1420. Capture application 1412 stores the pages that it could not classify to content management system 1420 as individual pages. According to one embodiment, capture application 1412 stores the classified documents and unclassified pages to content management system 1420 according to a document hierarchy for a merged document.

Capture application 1412 is further executable to access pages 1416 from file share 1415 or other source and merge pages 1416 into a separated document (e.g., into an unclassified separated document). The separated document can also be stored in a hierarchy established for a merged document.

Memory 1430 stores instructions executable by processor 1424. For example, memory 1430 can include a content server 1432 executable by processor 1424 to manage a data store 1434 configured to store classified documents 1435, unclassified pages 1436 and separated documents 1438. According to one embodiment, content server 1432 manages files, folders and other data resources as a set of objects. Data store 1434 may thus be an object-based data store in which files, folders and other data resources are managed as a set of objects. The documents and pages are managed as files stored in a file system of data store 1434, files stored in a database (as blobs), or sets of logically related data managed as file objects. The managed folders of content server 1432 may be "virtual" folders that do not correspond to actual file directory paths in a file system of data store 1434.

In one embodiment, each document and page managed by content server 1432 is associated with respective document or page metadata. The metadata may include an object identifier associated with each item managed by the content server 1432. In particular, in order to manage content in the content management system (e.g., as stored in data store 1434), content server 1432 may utilize one or more object identifiers, such as GUIDs to identify objects. Such object identifiers may be used throughout classification system 1400 to identify individual classified documents 1435, unclassified pages 1436 and separated documents 1438. According to one embodiment, document metadata data can include a document classification, a classification confidence, metadata extracted from the document and other metadata.

Content server 1432 can provide a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. The content navigation structure may or may not reflect an actual arrangement of files and folders in a file system of data store 1434.

Content server 1432 provides interface functionality for accessing items managed by content management system 1420. The interface functionality may be provided through any suitable mechanism including, but not limited to, a web application server exposing a REST API or another mechanism. Content server 1432 processes requests submitted via the interface to enable applications or users to perform various operations, such as uploading items, downloading items, reserving items, editing content, searching, adding items to containers, removing items from containers, adding containers, editing containers, removing containers and other operations. Capture system 1402, content analytics system 1450, integration system 1480 and operator system 1500 can use the interface to interact with content server 1432 to retrieve and store documents, pages or related metadata.

Memory 1460 stores instructions executable by processor 1454. For example, memory 1460 can include a classification application 1462 executable by processor 1454 to classify unclassified pages and separated documents. According to one embodiment, classification application 1462 is executable to provide crawler 410, pipeline 412, content analytics module 414, and merger service 422 and maintain pipeline data store 423. Memory 1460 is configured with a page-level recognition model 1464 and a document-level recognition model 1466.

According to one embodiment, classification application 1462 is configured to access a set of unclassified pages from unclassified pages 1436, extract content from each unclassified page and determine a page-level classification for each unclassified page in the set of unclassified pages by processing the content extracted from the unclassified page using page-level recognition model 1464 to determine a page-level classification for the page. Classification application 1462 is further configured to identify a sequence of unclassified pages corresponding to documents based on the page-level classifications determined for the set of unclassified pages. More particularly, classification application 1462 can apply various page grouping rules to identify page groups and orphans based on the page-level classifications output for the batch. A sequence of pages corresponding to a document can be identified as a sequence from a page classified as a document start page to page classified as a document end page or a sequence of pages meeting another page grouping rule. Classification application 1462 can further generate an indication of a sequence of unstructured document pages (e.g., a page group definition).

Classification application 1462 is further configured to access an unclassified separated document 1438, extract content from the unclassified separated document and process content from the unclassified separated document using the document-level recognition model 1468 to classify the document. Classification application 1462 stores the classification, a classification confidence and metadata extracted from the separated document.

Integration system 1480 is configured to integrate the processing of capture system 1402 and content analytics system 1450. According to one embodiment, memory 1490 includes an integration application 1492 executable by processor 1484 to interact with content management system 1420, content analytics system 1450 and to upload files to file share 1415. Content analytics system 1450 receives an indication of a sequence of pages (e.g., a page group definition) and indications of orphans from content analytics system 1450.

According to one embodiment, content classification system 1400 merges pages into a separated document based on page group definition or other indication of pages corresponding to a document. For example, integration application 1492 may use an indication of a sequence of pages received from content analytics system 1450 to download a sequence of unclassified pages from content management system and then copy the sequence of pages to a folder of file share 1415 as files 1416. Capture system 1402, as discussed above, can then merge files 1416 in a folder to create a separated document and store the separated document as an unclassified separated document 1438.

Integration application 1492 can also receive a document-level classification, confidence and other metadata for a separated document 1438 from content analytics system 1450 and upload the document-level classification, confidence and other metadata to content management system 1420, such that a previously unclassified separated document is stored as a classified separated document.

Memory 1510 can include a client application 1514 executable by processor 1504. Client application 1514 can interact with content management system 1420 to allow a user to view a content navigation structure provided by content management system 1420. For example, client application 1514 can render a user interface to allow a user to view classified documents 1435, unclassified pages 1436 and separated documents 1438. As a more particular example, client application 1514 can render a user interface such as illustrated in FIG. 2A, FIG. 2B and FIG. 2C. A variety of other operator systems may also be provided, such as, but not limited to, administrator systems to configure classification system 1400. According to one embodiment, client application 1514 is a web browser.

For the purpose of illustration, a single computer system is shown for each of capture system 1402, content management system 1420, content analytics systems 1450, integration system 1480 and operator system 1500. However, each of capture system 1402, content management system 1420, content analytics systems 1450, integration system 1480 and operator system 1500 may include a plurality of interconnected computers. Each of capture system 1402, content management system 1420, content analytics systems 1450, integration system 1480 and operator system 1500 may have more than one processor, memory or other hardware component, though, for the sake of brevity, each is illustrated as having one of each of the hardware components, even if more than one is used. Those skilled in the art will further recognize that capture system 1402, content management system 1420, content analytics systems 1450, integration system 1480 and operator system 1500, while illustrated separately, may share processors, memory or other hardware.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
   a processor; and
   a non-transitory computer-readable medium storing instructions executable by the processor to:
   provide an interface to a client application that is configured to enable a user of a client device to interact with a content management system to view a content navigation structure, the content navigation structure provided by the content management system that is configured to interact with a distributed system that comprises a memory configured with a page-level recognition model trained to recognize a document start page and a document end page of an unstructured document and a document-level recognition model trained to recognize a document type and stored instructions executable by a distributed system processor to:

for each unstructured document page in a set of unstructured document pages, determine a page-level classification for the unstructured document page by processing content extracted from the unstructured document page using the page-level recognition model to determine the page-level classification;

based on the page-level classifications for the unstructured document pages in the set of unstructured document pages, identify a sequence of unstructured document pages from a first unstructured document page classified as the document start page to a second unstructured document page classified as the document end page;

determine a first document-level classification for a separated unstructured document created from the sequence of unstructured documents by processing content extracted from the separated unstructured document using the document-level recognition model; and automatically update metadata for the separated unstructured document with the first document-level classification.

2. The system of claim 1, wherein the stored instructions are further executable by the distributed system processor to:
    access a merged document obtained via a capture application that is configured to ingest a set of pages.

3. The system of claim 1, wherein:
    the interface is configured to visualize the content navigation structure as a hierarchical tree structure in which nodes in the hierarchical tree structure correspond to files and folders arranged based on parent-child relationships defined in file objects and folder objects associated with the files and folders.

4. The system of claim 1, wherein:
    the content navigation structure enables a visualization of resources that are arranged in identifiable containers.

5. The system of claim 1, wherein:
    the interface is configured to provide a visualization of one or more of:
        a classified document,
        an unclassified page, or
        a separated document.

6. The system of claim 1, wherein the stored instructions are further executable by the distributed system processor to:
    separate a merged document containing structured and unstructured documents into a first set of classified documents and the set of unstructured document pages; and
    individually store each unstructured document page in the set of unstructured document pages.

7. The system of claim 6, wherein the stored instructions are further executable by the distributed system processor to store the first set of classified documents and separated unstructured document in a hierarchy established for the merged document.

8. A computer program product comprising a non-transitory computer-readable medium storing instructions executable by a processor to: provide an interface to a client application that is configured to enable a user of a client device to interact with a content management system to view a content navigation structure, the content navigation structure provided by the content management system that is configured to interact with a distributed system that comprises a memory configured with a page-level recognition model trained to recognize a document start page and a document end page of an unstructured document and a document-level recognition model trained to recognize a document type and stored instructions executable by a distributed system processor to:

for each unstructured document page in a set of unstructured document pages, determine a page-level classification for the unstructured document page by processing content extracted from the unstructured document page using the page-level recognition model to determine the page-level classification for the unstructured document page;

based on the page-level classifications for the unstructured document pages in the set of unstructured document pages, identify a sequence of unstructured document pages from a first unstructured document page classified as the document start page to a second unstructured document page classified as the document end page;

determine a first document-level classification for a separated unstructured document created from the sequence of unstructured documents by processing content extracted from the separated unstructured document using the document-level recognition model; and automatically update metadata for the separated unstructured document with the first document-level classification.

9. The computer program product of claim 8, wherein the stored instructions are further executable by the distributed system processor to:
    access a merged document obtained via a capture application that is configured to ingest a set of pages.

10. The computer program product of claim 8, wherein:
    the interface is configured to visualize the content navigation structure as a hierarchical tree structure in which nodes in the hierarchical tree structure correspond to files and folders arranged based on parent-child relationships defined in file objects and folder objects associated with the files and folders.

11. The computer program product of claim 8, wherein:
    the content navigation structure enables a visualization of resources that are arranged in identifiable containers.

12. The computer program product of claim 8, wherein:
    the interface is configured to provide a visualization of one or more of:
        a classified document,
        an unclassified page, or
        a separated document.

13. The computer program product of claim 8, wherein the stored instructions are further executable by the distributed system processor to:
    separate a merged document containing structured and unstructured documents into a first set of classified documents and the set of unstructured document pages; and
    individually store each unstructured document page in the set of unstructured document pages.

14. The computer program product of claim 13, wherein the stored instructions are further executable by the distributed system processor to store the first set of classified documents and separated unstructured document in a hierarchy established for the merged document.

15. A method comprising:
providing an interface to a client application that is configured to enable a user of a client device to interact with a content management system to view a content navigation structure, the content navigation structure provided by the content management system that is configured to interact with a distributed system that comprises a memory configured with a page-level recognition model trained to recognize a document start page and a document end page of an unstructured document and a document-level recognition model trained to recognize a document type and stored instructions executable by a distributed system processor to:
for each unstructured document page in a set of unstructured document pages, determine a page-level classification for the unstructured document page by processing content extracted from the unstructured document page using the page-level recognition model to determine the page-level classification for the unstructured document page;
based on the page-level classifications for the unstructured document pages in the set of unstructured document pages, identify a sequence of unstructured document pages from a first unstructured document page classified as the document start page to a second unstructured document page classified as the document end page;
determine a first document-level classification for a separated unstructured document created from the sequence of unstructured documents by processing content extracted from the separated unstructured document using the document-level recognition model; and
automatically update metadata for the separated unstructured document with the first document-level classification.

16. The method of claim 15, wherein the stored instructions are further executable by the distributed system processor to:
access a merged document obtained via a capture application that is configured to ingest a set of pages.

17. The method of claim 15, wherein:
the interface is configured to visualize the content navigation structure as a hierarchical tree structure in which nodes in the hierarchical tree structure correspond to files and folders arranged based on parent-child relationships defined in file objects and folder objects associated with the files and folders.

18. The method of claim 15, wherein:
the content navigation structure enables a visualization of resources that are arranged in identifiable containers.

19. The method of claim 15, wherein:
the interface is configured to provide a visualization of one or more of:
a classified document,
an unclassified page, or
a separated document.

20. The method of claim 15, wherein the stored instructions are further executable by the distributed system processor to:
separate a merged document containing structured and unstructured documents into a first set of classified documents and the set of unstructured document pages; and
individually store each unstructured document page in the set of unstructured document pages.

21. The method of claim 20, wherein the stored instructions are further executable by the distributed system processor to store the first set of classified documents and separated unstructured document in a hierarchy established for the merged document.

* * * * *